Patented Aug. 22, 1939

2,170,380

UNITED STATES PATENT OFFICE 2,170,380

ALIPHATIC SULPHONIC ACID

Hermann Holsten, Ludwigshafen-on-the-Rhine, Germany, assignor to I. G. Farbenindustrie Aktiengesellschaft, Frankfort - on - the - Main, Germany No Drawing. Application May 19, 1931, Serial No. 538,615. In Germany May 30, 1930

5 Claims. (Cl. 260—513)

The present invention relates to the production of assistants for the textile and related industries and particularly to the production of wetting, cleansing, dispersing and like agents.

It has already been proposed to convert alkyl sulphuric acid salts (containing the group $\equiv C-O-SO_3Me$ in which Me is the salt forming base) of low molecular alcohols, as for example of methyl, ethyl or amyl alcohol, into sulphonic acids (containing the group $\equiv C-SO_3H$) by heating with aqueous solutions of sodium sulphite.

I have now found that high quality wetting, cleansing, dispersing and the like agents are obtained by acting with salts of sulphurous acid, such as neutral sulphites or bisulphites, for example of sodium, potassium, ammonia, calcium or like alkaline bases on esters from aliphatic alcohols containing at least 8 carbon atoms in the molecule with mineral acids.

The reaction is preferably carried out in solution or suspension and it is frequently advantageous, depending on the nature of the materials employed, to work with the employment of a closed vessel and/or in the presence of superficially active catalysts, i. e. active carbon or diatomaceous earth and the like, or of buffers, such as boric acid, phosphates, such as tertiary sodium phosphate, or ammonium carbonate. Water is especially suitable as the solvent in many cases, but aqueous ethyl alcohol may also be employed. By heating, generally to above 100° C. and in most cases to temperatures between 100° and 250° C., the reaction may be rendered practically complete.

As initial materials may be mentioned for example sulphuric esters, hydrogen halide esters or phosphoric esters of the said high molecular alcohols. For example the esters of octyl alcohol, decyl, dodecyl, tetradecyl or octodecyl alcohols or octodecane-diol or mixtures thereof obtainable by reduction of vegetal, i. e. vegetable or animal, oils and fats, such as olive, soya, castor or coco oils, hydrogenated train oils, or of mixtures of these or of their acids and also the alcohols contained in waxes, such as cetyl, oleyl, ceryl or myricyl alcohols, or those contained in the products obtained by the oxidation of high molecular hydrocarbons with the aid of gaseous oxidizing agents and other alcohols with odd numbers of carbon atoms such as pentadecyl or heptadecyl alcohols may be employed. The term "alcohols" is used in a broad sense and is meant to include the hydroxyl bearing ethers of polyhydric alcohols, such as glycerol mono-tetradecyl ether. Mineral acid esters from olefines or their derivatives, as for example of tetradecene, octodecene and the like, may also be employed. The said initial esters may be obtained for example by esterification of alcohols containing one or more hydroxyl groups with mineral acids, with the aid of the acids or acid chlorides, chlorsulphonic acid or phosphorus oxychloride, or by adding mineral acids, such as sulphuric, hydrohalic or phosphoric acids, to one or more double linkages, or both steps may be carried out. In most cases mineral esters of alcohols containing from 10 to 18 carbon atoms give the most valuable products, but mineral esters of alcohols containing from 18 to 25 carbon atoms may also be employed.

The reaction products are obtained in the form of their solid salts or as solutions thereof and may be obtained in a very pure form by salting out or by subjecting the crude products to an extraction with methyl or ethyl alcohols or acetone, if desired. The salts of the sulphonic acids obtained may be converted into the free acids in any usual and convenient manner, as for example by a treatment of the salts with mineral acids, if desired after a conversion into lead salts, the free acids being applicable for the same purpose as the salts.

The resulting crude salt mixtures containing sulphites and sulphates are also suitable for the said purposes in many cases. The wetting, cleansing and the like agents obtainable in the said manner are more or less rapidly soluble in water. Contrasted for example with sulphuric acid esters of high molecular alcohols they have the advantage that when boiled with dilute mineral acids the sulphonic group is not split off; moreover, the products according to the present invention give no deposit of insoluble salts in water containing lime and magnesia. If the initial materials contain one or more hydroxyl groups besides the mineral ester groups, the products will consist of, or contain a substantial quantity of hydroxy-alkyl sulphonic acids, in which the hydroxyl group is usually in non-vicinal position to the carbon atom containing the sulphonic radicle; similarly double linkages in the final products are usually in non-vicinal position to the carbon atom containing the sulphonic radicle.

The field of employment of the said substances is very wide. They are eminently suitable for example as assistants in wetting and levelling for dyebaths, as dispersing agents in pastes of dyestuffs or other material, as wetting agents in carbonizing and mercerizing baths, for softening the touch of artificial silk or of fabrics, as additions to spinning baths in the preparation of artificial silk, for soaking hides and the like. With the aid of the said substances valuable very stable aqueous emulsions can be obtained from oils, fats, hydrocarbons, water-insoluble alcohols, ketones and the like which are advantageous for greasing, degreasing or oiling in the textile and leather industries and which may be employed as boring and lubricating oils. The said substances may be employed alone or in admixture with each other or with other wetting, cleansing and dispersing agents, such as soaps, products of the type of Turkey red oils, sulphonic acids of aliphatic or aromatic and particularly of polynuclear compounds or their salts, or with protective colloids, such as glue, gelatine or vegetable mucilages or gums. Salts as for example soda, sodium bicarbonate, waterglass, common salt, neutral or acid sodium sulphate may be added or organic solvents, such as mono-cresyl ethylene glycol ether, cyclohexanol or cyclohexanone, trichlor ethylene, or bleaching agents, such as perborates, percarbonates, paratoluene sulphonic chloramide sodium. The said agents are employed in quantities depending on the desired purpose and several of them may be added conjointly.

The following examples will further illustrate the nature of this invention, but the invention is not restricted to these examples. The parts are by weight.

*Example 1*

95 parts of dodecanol are esterified at from 15° to 25° C. with 60 parts of chlorsulphonic acid in 70 parts of ethyl ether. The sodium salt of the resulting sulphuric acid ester is heated for 12 hours in a stirring autoclave to about 200° C. with 600 parts of crystallized sodium sulphite and 700 parts of water. The reaction mixture is then diluted with water, solid common salt is added and the reaction product which separates in a crystalline form is filtered off by suction. Aqueous solutions of the resulting sodium salt ($C_{12}H_{25}$—$SO_3Na$) have excellent wetting power even in very small concentration.

*Example 2*

40 parts of the sodium salt of octodecyl alcohol sulphuric ester are heated for 10 hours to about 250° C. with 70 parts of sodium sulphite and 70 parts of water. The reaction product ($C_{18}H_{37}$—$SO_3Na$) which separates as a crystalline mass is comminuted, filtered by suction and washed with an approximately 10 per cent aqueous solution of common salt.

*Example 3*

40 parts of the sodium salt of octodecyl alcohol sulphuric ester are heated to about 200° C. for from 10 to 12 hours with a solution of 70 parts of sodium sulphite in 70 parts of water and 20 parts of 96 per cent ethyl alcohol. The whole is worked up as described in Example 2.

*Example 4*

125 parts of chlorsulphonic acid are slowly stirred at from 15° to 25° C. into 200 parts of the mixture of alcohols, obtained by the catalytic reduction of coconut oil and having a boiling point of from 100° to 210° C. at 18 millimeters mercury gauge, whereupon the mixture is heated to 35° C. for ½ hour for removing hydrochloric acid formed. The acid sulphuric ester obtained is then placed into a stirring autoclave and a layer consisting of a mixture of 1700 parts of an aqueous solution of sodium bisulphite of 39° Bé. strength and 860 parts of an aqueous caustic soda solution of 40° Bé. strength is superimposed, whereupon the whole is stirred for 10 hours at about 200° C. The reaction mixture is inspissated to about 2000 parts and then mixed with 1000 parts of commercial ethyl alcohol whereupon the inorganic salts are separated off. After distilling off the aqueous alcohol a product is obtained, aqueous solutions of which show a high foaming power. If the difficultly water-soluble constituents be separated by fractional crystallization from the mixture of sulphonic acid salts, the mixture of the sulphonic salts of low molecular weight obtained dissolves in strongly acid aqueous liquids, for example in a sulphuric acid of 54° Bé. strength as is employed in the production of glazed cotton fabrics, and effects a rapid wetting of goods to be treated with the said solutions.

*Example 5*

20 parts of octodecyl bromide are heated to from 130° to 160° C. for a long time with 40 parts of sodium sulphite and 100 parts of water. The reaction product may be isolated in the form of a white powder by filtering the sulphite solution. Solutions of the product have an excellent foaming power.

Other salts of sulphurous acid, as for example ammonium or calcium sulphite, may be employed instead of sodium sulphite. Similar products are obtained from halogen hydride esters of other high molecular alcohols, such as decanol or dodecanol.

*Example 6*

72 parts of octodecane-diol, obtainable by the catalytic reduction of castor oil, are suspended in 150 parts of ethyl ether and converted into the sulphuric ester by stirring with 60 parts of chlorosulphonic acid at room temperature. The reaction product is poured onto ice, rendered neutral with the aid of aqueous caustic soda solution and 25 parts of tertiary sodium phosphate and then inspissated almost to dryness. 235 parts of a paste are obtained which are then heated in an autoclave, while stirring for 10 hours at 180° C., together with 425 parts of an aqueous solution of sodium bisulphite of 40° Bé. strength and 175 parts of aqueous caustic soda solution of 40° Bé. strength. The reaction product is filtered off by suction, refluxed for 1 hour with 750 parts of water and 150 parts of concentrated hydrochloric acid, cooled, filtered off by suction and dried.

*Example 7*

15 parts of the sodium salt of the sulphuric ester of oleic alcohol, obtainable by acting on oleic alcohol, dissolved in ethyl ether, with an equimolecular proportion of chlorsulphonic acid, are heated for 8 hours to 180° C. together with 140 parts of an aqueous solution of sodium bisulphite of 40° Bé. strength and 60 parts of an aqueous caustic soda solution of 40° Bé. strength. The reaction product is refluxed with hydrochloric acid as described in Example 6, whereby the unsaturated sulphonic acid ($C_{18}H_{35}$—$SO_3H$) together with a small quantity of unaltered oleic alcohol separates out as an oily layer.

*Example 8*

350 parts of the ammonium salt of the acid sulphuric ester of octodecyl alcohol are heated for 5 hours at 150° C. together with 550 parts of ammonium sulphite, 100 parts of ammonium carbonate and 1250 parts of water. The solid reaction product dissolves in hot water with the formation of a jelly.

Example 9

30 parts of tetradecyl dihydroxy-propyl ether, obtainable from the sodium compound of tetradecyl alcohol and glycerol-α-monochlorhydrin, are suspended in 30 parts of ethyl ether and then stirred with 25 parts of chlorsulphonic acid at from 20° to 25° C. The solution of the acid sulphuric ester obtained is poured onto ice and rendered neutral with the aid of aqueous caustic potash solution, freed from the ether and diluted with water to 250 parts. The solution is then heated in an autoclave for 8 hours to from 160° to 180° C. together with 60 parts of potassium sulphite. The reaction mixture is rendered weakly acid with the aid of sulphuric acid and heated to boiling until free sulphurous acid is driven off, whereupon the whole is inspissated.

What I claim is:

1. The process for the production of assistants for the textile and related industries, which comprises heating an alkali metal salt of sulphurous acid with a sulphuric ester of an aliphatic primary alcohol containing at least eight carbon atoms to a temperature between 100° and 250° C.

2. The process for the production of assistants for the textile and related industries, which comprises heating an alkali metal sulphite with a sulphuric ester of an aliphatic primary alcohol containing at least eight carbon atoms to a temperature between 100° and 250° C.

3. The process for the production of assistants for the textile and related industries which comprises heating a sodium sulphite with a sulphuric ester of an aliphatic primary alcohol containing from 10 to 18 carbon atoms to a temperature between 100° and 250° C. in the presence of water.

4. The method of producing salts of higher molecular sulphonic acids which comprises converting a higher molecular alcohol to a sulphuric acid ester by treatment with chloro-sulphonic acid and converting the ester to a salt of sulphonic acid by treatment with a neutral salt of sulphurous acid.

5. The method of producing salts of sulphonic acids which comprises reacting high molecular alcohol of the type obtained from the natural fats and waxes with a mineral acid to produce mineral acid esters, converting this product into salts of sulphonic acids by reacting with neutral salt of sulphurous acid at a high temperature and under pressure.

HERMANN HOLSTEN.